United States Patent
Mahnken et al.

(10) Patent No.: US 9,652,831 B2
(45) Date of Patent: May 16, 2017

(54) ISOTROPIC RECONSTRUCTION OF IMAGE DATA

(71) Applicant: Siemens Aktiengesellschaft, Munich (DE)

(72) Inventors: Andreas Mahnken, Aachen (DE); Bernhard Schmidt, Fuerth (DE); Martin Sedlmair, Zirndorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 40 days.

(21) Appl. No.: 14/429,179

(22) PCT Filed: Jul. 18, 2013

(86) PCT No.: PCT/EP2013/065229
§ 371 (c)(1),
(2) Date: Mar. 18, 2015

(87) PCT Pub. No.: WO2014/053256
PCT Pub. Date: Apr. 10, 2014

(65) Prior Publication Data
US 2015/0221067 A1 Aug. 6, 2015

(30) Foreign Application Priority Data
Oct. 1, 2012 (DE) .................. 10 2012 217 940

(51) Int. Cl.
*G06K 9/00* (2006.01)
*G06T 5/00* (2006.01)
(Continued)

(52) U.S. Cl.
CPC ............ *G06T 5/001* (2013.01); *G06K 9/52* (2013.01); *G06T 5/00* (2013.01); *G06T 7/004* (2013.01);
(Continued)

(58) Field of Classification Search
None
See application file for complete search history.

(56) References Cited

U.S. PATENT DOCUMENTS 7,948,503 B2 * 5/2011 Shekhar ............... G01T 1/1647
345/648
2003/0052879 A1 3/2003 Barth et al.
(Continued)

FOREIGN PATENT DOCUMENTS

CN 101048802 10/2007
DE 19962666 A1 7/2001

OTHER PUBLICATIONS

Vlassenbroek, "The Use of Isotropic Imaging and Computed Tomography Reconstructions", Comparative Interpretation of CT and Standard Radiography of the Chest 2011.*
(Continued)

*Primary Examiner* — Soo Jin Park
(74) *Attorney, Agent, or Firm* — Harness, Dickey & Pierce, P.L.C.

(57) ABSTRACT

An example of the invention relates to a method for the multidimensional reconstruction of image data in a reconstruction area based on projection measurement data which has been acquired using an imaging system, preferably a computed tomography system, wherein the reconstruction is carried out in three different spatial directions with predefined resolution widths; a resolution width in at least one spatial direction being automatically adapted to a resolution width in another spatial direction, such that the adapted resolution widths are substantially identical.

31 Claims, 6 Drawing Sheets

(51) Int. Cl.
G06T 11/00 (2006.01)
G06K 9/52 (2006.01)
G06T 7/00 (2017.01)
G06T 7/20 (2017.01)
(52) U.S. Cl.
CPC ............. *G06T 7/20* (2013.01); *G06T 11/006* (2013.01); *G06T 2207/10081* (2013.01)

(56) References Cited

U.S. PATENT DOCUMENTS

2007/0297660 A1* 12/2007 Hsieh ................ A61B 6/032 382/131
2008/0130974 A1 6/2008 Xu et al.
2011/0116594 A1* 5/2011 Yamakawa ......... A61B 6/032 378/19

OTHER PUBLICATIONS

International Search Report PCT/ISA/210 for International Application No. PCT/EP2013/065229, Dated Sep. 12, 2013.
Kalender W. A.; "Thin-Section Three-Dimensional Spiral CT: Is Isotropic Imaging Possible?"; Radiology; vol. 197; pp. 578-580; 1995.
Maret D. et al; "Effect of voxel size on the accuracy of 3D reconstrutions with cone beam CT"; Deno Maxillo Facial Radiology Dec. 2012; vol. 41; No. 8. pp. 640-655; ISSN: 0250-832X; XP000172168; 2012; May 3, 2012.
Kalender W. A.; "Computertomographie, Grundlagen, Gerätetechologie, Bildqualität, Anwendungen"; Publics Corporate Publishing; 2. Überarbeitete und erweiterte Auflage 2006; pp. 112-114; ISBN: 9783895782152. XP002479761; 2006.
Vlassenbroek Alain; "The Use of Isotropic Imaging and Computed Tomopraphy Reconsturctions"; Comparatice Interpretation of CT and Standard Radiography of the Chest, Springer; pp. 53-73; DOI: 10.1007/978-3-540-79942-9_3; XP009172232; 2011.
International Search Report dated Sep. 12, 2013.
German Office Action dated Aug. 8, 2013.
Chinese Office Action and English translation thereof dated Aug. 11, 2016.

* cited by examiner

ISOTROPIC RECONSTRUCTION OF IMAGE DATA

PRIORITY STATEMENT

This application is the national phase under 35 U.S.C. §371 of PCT International Application No. PCT/EP2013/065229 which has an International filing date of Jul. 18, 2013, which designated the United States of America, and which claims priority to German patent application number DE 102012217940.2 filed Oct. 1, 2012, the entire contents of each of which are hereby incorporated herein by reference.

FIELD

At least one embodiment of the invention generally relates to a method for the reconstruction of image data on the basis of projection measurement data, a reconstruction unit for the reconstruction of image data on the basis of projection measurement data and/or an imaging system with a corresponding reconstruction unit.

BACKGROUND

With the aid of modern imaging methods, three-dimensional image data is often created which can be used for visualizing an imaged object under investigation and for other uses. For example, organs or other structures of a patient or other object under investigation can be recorded in the spatial position thereof in order, for example, to initiate further analyses based thereon. In particular, a "segmentation" of individual organs or structures can be carried out so that this data can be used for subsequent considerations. It is herein decisive that geometrical distortions during the generation of the three-dimensional image data, i.e. the "volume image data" are suppressed or prevented as far as possible.

The projection measurement data needed for the reconstruction of the volume image data is acquired, for example, by way of a computed tomography (CT) system. In CT systems, a combination of an X-ray source and, mounted opposite thereto, an X-ray detector arranged on a rotating gantry revolves around a measurement space in which the object under investigation (which is identified below as a patient, but without restricting the generality thereof) is situated. The center of rotation (also known as "isocenter") coincides with a "system axis" z which extends parallel to an advancing direction of a patient table. With the aid of the patient table, the patient can be moved in and out of the measurement space. During one or two rotations, the patient is irradiated with X-ray radiation from the X-ray source, wherein projection measurement data or X-ray projection data is detected with the aid of the X-ray detector positioned opposite thereto. The circulation of the X-ray system defines an "axial plane" or a "transverse plane" in which projection data is generated and recorded in each case and which is transverse, in particular perpendicular, to the system axis z. The spatial directions within an axial plane of this type are identified below as "axial plane directions".

In modern computed tomography, in addition to the axial representation, the reconstructed (two-dimensional) image data or sectional images are typically reformatted into different spatial directions or from these, as aforementioned, coherent three-dimensional image data, that is, "volume image data" is generated and visualized. However, the aforementioned further processing of the reconstructed volume image data, for example, for segmentation or for three-dimensional representation, is relatively difficult. The reconstructed volume image data depends at least partially on the geometry of the X-ray detector or, in some other way, on the design or the "hardware" of the computed tomography system. The design of the detector and of the computed tomography system pre-determines, for example, a minimum achievable resolution width of the three-dimensional image data, that is, the minimal size of a voxel.

In particular, mostly, axial "primary layers" which have a specific extent in the z-direction are reconstructed on the basis of the projection measurement data acquired in an axial plane. This extent of the primary layers can be pre-determined by the detector geometry and, in particular, by the extent of an individual detector element (pixel of the detector) in the direction of the system axis z. The primary layers therefore have a "hardware-dependent extent" in the z-direction. As mentioned, the patient table or the gantry is displaced parallel to the system axis z so that the detector and the X-ray source are moved relative to the patient. From the series of several axial sectional images or primary layers, three-dimensional image data can also be reconstructed, wherein the extent of a volume image point (voxel) is less than the extent of a detector element in the z-direction. For this purpose, the advance of the patient table in the z-direction (i.e. the distance covered by the detector in the z-direction between two recording time points from the same projection direction) must only be less than the extent of a detector element in the z-direction. In this case, projection measurement data or primary layers are produced which overlap spatially in the z-direction, and which allow a reconstruction with increased resolution in the z-direction; in this regard, a resolution increase by "overscanning" can be said to take place. Furthermore, corresponding volume image data has a "hardware-dependent extent" in the z-direction which is given by the advance of the patient table and the size of individual detector elements.

The resolution of the image data in the axial plane directions, that is, transversely to the system axis z is also "hardware-dependently pre-determined". This essentially means that the resolution of the primary layers in the axial plane is determined by the geometry of the measurement space and the circulation of the radiation source around the measurement space.

Since these "hardware-dependent factors" can vary even in different CT scans with the same CT system (for example, the advancing speed of the patient table can be changed), the aforementioned difficulties often arise in the further use of the reconstructed image data.

SUMMARY

At least one embodiment of the present invention is directed to making three-dimensional image data available such that it can be visualized in a simple way and, if required, made available for a further-reaching application or subsequently processed in a simple way.

At least one embodiment is directed to a reconstruction method, a reconstruction unit and/or an imaging system.

At least one embodiment of the invention is based on the realization that it is advantageous for the further use of three-dimensional image data to design the image data to be, as far as possible, independent of the aforementioned hardware conditions of the data acquisition. In particular, the influence of the design of an imaging system on reconstructed volume image data should be as small as possible.

The method according to at least one embodiment of the invention for multi-dimensional reconstruction of image data on the basis of projection measurement data that was recorded with the aid of an imaging system, preferably a computed tomography system, concerns the reconstruction in at least three mutually different spatial directions in a reconstruction region. The reconstruction region is an at least three-dimensional spatial region for the whole extent of which the image data is to be reconstructed. This involves the three-dimensional position space region. Indeed, it is not precluded that the invention is also used in the reconstruction of time-dependent volume image data so that the reconstruction region can also comprise, for example, a fourth dimension, in this case, time. In this respect, time could also be regarded as a "spatial direction". However, for the further views, it is only the three-dimensional position space that is considered, that is, the spatial directions are to be considered as directions in position space.

Furthermore, according to at least one embodiment of the invention, a reconstruction unit for reconstructing image data on the basis of projection measurement data recorded with the aid of an imaging system, preferably a computed tomography system is proposed. The reconstruction according to the invention takes place in the reconstruction unit in at least three spatial directions different from one another, i.e. at least three-dimensionally, wherein pre-determined resolution widths are taken into account. That is, resolution widths are pre-determined in the direction of the aforementioned reconstruction vectors, particularly system-dependent, for example, as first, second and third voxel widths. The reconstruction unit according to at least one embodiment of the invention comprises an input interface for recording the projection measurement data and a reconstruction processor which carries out the reconstruction calculations with the aid of a reconstruction kernel in particular. The reconstruction processor is configured to define automatically at least one resolution width in at least one of the three spatial directions, for example, depending on a resolution width in one other of the three spatial directions such that the resolution widths specified for reconstruction are substantially identical in the direction of the reconstruction vectors.

Apart from having the usual components, a medical imaging system according to at least one embodiment of the invention, in particular a computed tomography system, is equipped with a reconstruction unit according to at least one embodiment of the invention.

The reconstruction unit could also be designed as a hardware component supported by software. A realization largely through software has the advantage that, for example, conventionally used reconstruction units can be upgraded by easy means with a software update in order to operate in the manner according to at least one embodiment of the invention. At least one embodiment of the invention therefore also includes a computer program product which can be loaded directly into a processor of a programmable computer device of a reconstruction device having program code segments in order to carry out all the steps of the method according to at least one embodiment of the invention when the program is executed in the processor.

BRIEF DESCRIPTION OF THE DRAWINGS

The invention will now be described again in greater detail with reference to example embodiments. In the various drawings, the same components are identified with identical reference signs. In the drawings.

DETAILED DESCRIPTION OF EXAMPLE EMBODIMENTS

Figure 1:
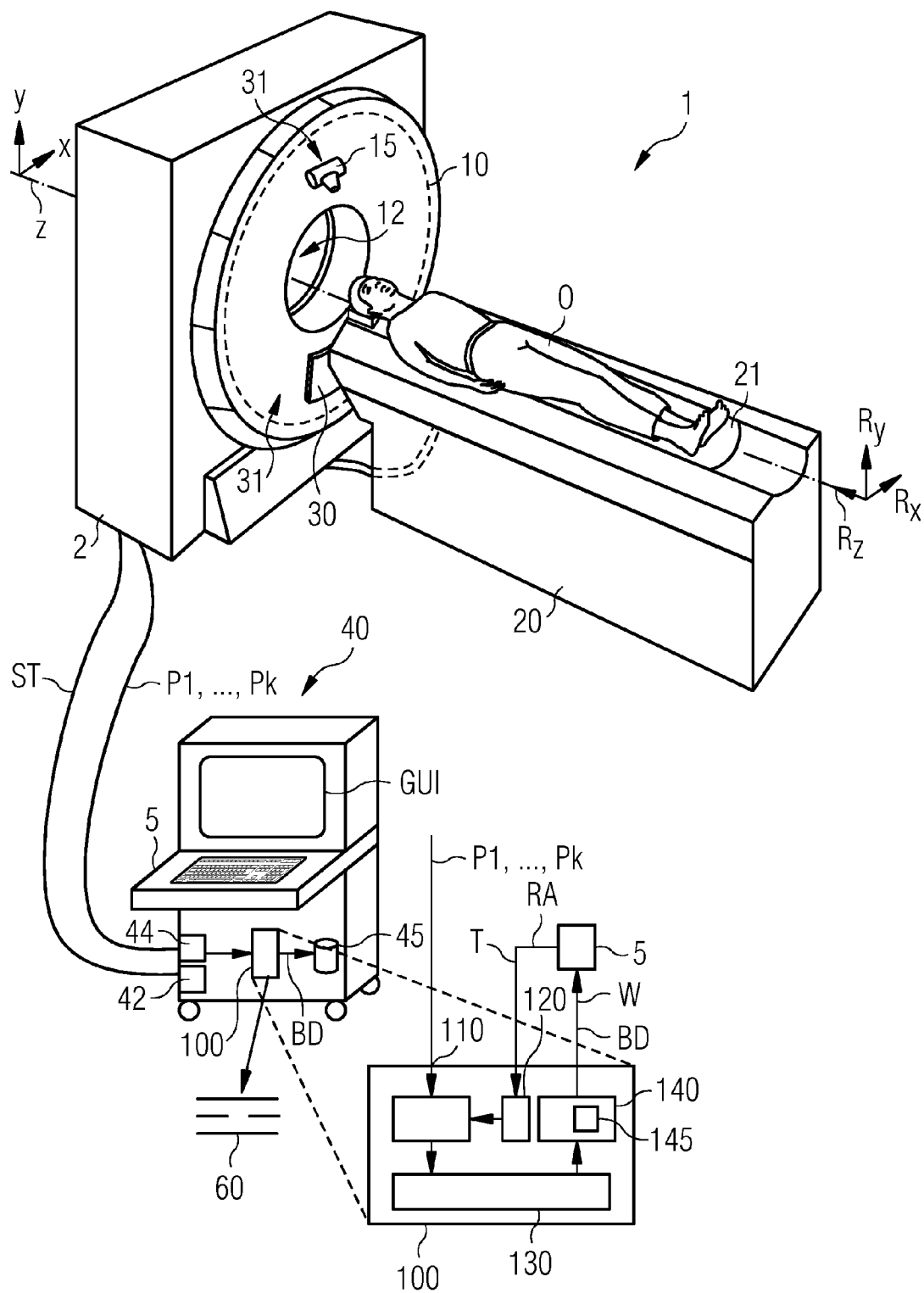
FIG. 1 is an imaging system with an example embodiment of a reconstruction unit according to the invention.

The method according to at least one embodiment of the invention for multi-dimensional reconstruction of image data on the basis of projection measurement data that was recorded with the aid of an imaging system, preferably a computed tomography system, concerns the reconstruction in at least three mutually different spatial directions in a reconstruction region. The reconstruction region is an at least three-dimensional spatial region for the whole extent of which the image data is to be reconstructed. This involves the three-dimensional position space region. Indeed, it is not precluded that the invention is also used in the reconstruction of time-dependent volume image data so that the reconstruction region can also comprise, for example, a fourth dimension, in this case, time. In this respect, time could also be regarded as a "spatial direction". However, for the further views, it is only the three-dimensional position space that is considered, that is, the spatial directions are to be considered as directions in position space.

The three spatial directions which are also represented in the following as "reconstruction vectors" enable a description of the reconstruction region and form a, preferably orthogonal, generator system for the three-dimensional spatial region. This means that the reconstruction vectors are linearly independent of one another.

The reconstruction according to at least one embodiment of the invention is carried out taking account of initially pre-determined, preferably system-dependent, resolution widths in the direction of the reconstruction vectors. System-dependent resolution widths are understood particularly to mean, as described above, resolution widths which are determined by the "hardware" or the design of the imaging system or of the detector. The system-dependent resolution widths are identified below, for example, as "first, second and third voxel widths" (in the three spatial directions) for the image data to be reconstructed.

The pre-determined resolution widths, i.e. the first, second and third voxel width may be, in particular, the resolution widths of the primary layers in the direction of the reconstruction vectors. The reconstruction vectors can coincide, for example, with the aforementioned system axis z and with the respective spatial directions x and y orthogonal to z and orthogonal to one another, or can extend parallel to these directions. However, it is also conceivable that the pre-determined resolution widths are pre-determined in another way, e.g. by a user of the imaging system.

In accordance with the reconstruction method according to at least one embodiment of the invention, an automatic adaptation of a resolution width takes place in at least one spatial direction, that is, a change of at least one of the initially pre-determined resolution widths (i.e. the first, second or third voxel width), to a resolution width in at least one other of the three spatial directions such that the adapted resolution widths are substantially identical. The resolution widths are considered in the direction of the reconstruction vectors and a "change of a resolution width" is to be understood in that it is at least checked whether one of the relevant resolution widths must be changed in order to obtain substantially identical resolution widths. "Substantially" is to be understood in this context such that each voxel has an identical resolution width in the desired spatial directions except for rounding errors in an automatic calculation or the automatic adaptation and also possibly except for relatively small, slight deviations of preferably not more than 10%, more preferably not more than 5% and most preferably not more than 2% of the resolution width. The deviations described can particularly be caused system-dependently. For example, due to the calculation rules of a reconstruction kernel, a deviation of not more than 10% can occur. For "MPR (multiplanar reformatting)" uses, the deviations described are, for example, no more than 2% and preferably, for VRT (volume-rendering technique) uses, the deviations are no more than 5%. However, a plurality of post-processing methods produce good results, with a deviation of the resolution widths of no more than 10%, so that even this limitation simplifies a large number of applications. The slight deviations can occur, particularly in border regions of a reconstruction region or in the voxels directly associated with the edge of the reconstruction region. This means that "substantially" should be understood such that the reconstruction region reconstructed according to the invention is reconstructed with a plurality of voxels with identical resolution widths in the desired spatial directions.

Thus, with the aid of at least one embodiment of the invention, universally scalable, three-dimensional image data can be generated without complex interim calculation steps or conversions being necessary for further processing, particularly for imaging. In this way, a broad spectrum of uses is available for the image data generated. For example, on the basis of the image data, particularly simple structural or model data can be derived for any desired object under investigation.

It should be emphasized herein that the reconstruction according to at least one embodiment of the invention can also comprise the reconstruction of the aforementioned primary layers which are reconstructed with a pre-determined resolution width "inplane", that is, orthogonally to the system axis z in the axial plane. Accordingly, a reconstruction within an axial plane is also denoted below as "inplane reconstruction". In contrast thereto, a reconstruction in the direction of the above-described advancing direction of the patient table, which extends parallel to the system axis z, is denoted below a "z-reconstruction".

Typically, the resolution widths between an inplane reconstruction and a z-reconstruction differ. Contrary to a conventional reconstruction, the invention makes a plurality of possibilities available, as early as during the generation of the reconstructed image data, to remove this typical "hardware-close" or "hardware-produced" differentiation of the resolution widths of the inplane reconstruction and of the z-reconstruction, so that the image data is universally usable. Therefore, in the method according to the invention, it is particularly preferably provided that at least the resolution width in the z-direction (i.e. in the advancing direction or in the direction of the system axis of the CT system) is adapted to a resolution width in an axial-plane direction extending transversely, particularly perpendicularly, thereto (thus, for example, the x and/or y-direction) or vice versa. Particularly preferably, the resolution widths in all three position space directions are matched to one another. Voxels with this property are identified as "isotropic voxels".

It should additionally be mentioned that, apart from the adaptation of the resolution widths according to at least one embodiment of the invention, any desired conventional reconstruction method can be used, for example, a conventionally filtered back projection or an iterative reconstruction method, etc.

Furthermore, according to at least one embodiment of the invention, a reconstruction unit for reconstructing image data on the basis of projection measurement data recorded with the aid of an imaging system, preferably a computed tomography system is proposed. The reconstruction according to the invention takes place in the reconstruction unit in at least three spatial directions different from one another, i.e. at least three-dimensionally, wherein pre-determined resolution widths are taken into account. That is, resolution widths are pre-determined in the direction of the aforementioned reconstruction vectors, particularly system-dependent, for example, as first, second and third voxel widths. The reconstruction unit according to at least one embodiment of the invention comprises an input interface for recording the projection measurement data and a reconstruction processor which carries out the reconstruction calculations with the aid of a reconstruction kernel in particular. The reconstruction processor is configured to define automatically at least one resolution width in at least one of the three spatial directions, for example, depending on a resolution width in one other of the three spatial directions such that the resolution widths specified for reconstruction are substantially identical in the direction of the reconstruction vectors.

Preferably, the reconstruction unit also has an output interface for the output of the reconstructed image data. Output should be understood in this case to include the transfer of image data to other units or modules, wherein the image data can then possibly be further processed and/or stored. Naturally, the output of the image data to a user, for example, via a suitable user interface, for example, a display device or a printer is included within the expression "output".

Apart from having the usual components, a medical imaging system according to at least one embodiment of the invention, in particular a computed tomography system, is equipped with a reconstruction unit according to at least one embodiment of the invention.

The reconstruction unit of at least one embodiment, in particular the reconstruction processor, can be realized entirely or partially in the form of software modules in a processor, preferably belonging to an imaging system. Similarly, however, the reconstruction unit can also be configured as a hardware component, for example, in the form of suitably designed ASICs.

The reconstruction unit could also be designed as a hardware component supported by software. A realization largely through software has the advantage that, for example, conventionally used reconstruction units can be upgraded by easy means with a software update in order to operate in the manner according to at least one embodiment of the invention. At least one embodiment of the invention therefore also includes a computer program product which can be loaded directly into a processor of a programmable computer device of a reconstruction device having program code segments in order to carry out all the steps of the method according to at least one embodiment of the invention when the program is executed in the processor.

Further particularly advantageous embodiments and developments of embodiments of the invention are disclosed by the dependent claims and the following description, wherein the independent claims of one claim category can also be further developed similarly to the dependent claims of another claim category.

Particularly preferably, the automatic adaptation of the resolution width is carried out by adapting a reconstruction region dimension which has been specified for one plane of the reconstruction region, preferably for the aforementioned inplane reconstruction. For example, the reconstruction region dimension comprises a reconstruction diameter.

The reconstruction region dimension or the reconstruction diameter can correspond herein to the aforementioned plane of the reconstruction region, particularly initially (i.e. before the adaptation), of a spatial extent of a "field of view" (FoV) of a detector for detecting the projection measurement data. Preferably, the reconstruction region dimension or the reconstruction region diameter then defines the FoV in the direction transverse to the advancing direction of the detector, that is, "inplane".

Typically an area region of the aforementioned plane is defined as the FoV, from which, in all detector positions settable in the imaging system, projection data of the X-ray source can be detected such that image data can be reconstructed for the image points in this region. The maximum possible area region can easily be calculated by using the intercept theorem with the aid of the detector dimensions and the separations of the detector from the patient and from the X-ray source. In the event that X-ray projection data is recorded with a rotating X-ray source, the FoV can also be defined by the diameter of the circular sectional area region which the X-ray cone or fan "seen" by the detector could irradiate continuously with X-ray radiation during a rotation about the measurement space.

In the event of an inplane reconstruction, the reconstruction diameter typically substantially corresponds initially to the diameter of an FoV used for generating a primary layer. The resolution widths of the primary layer in the direction of the two reconstruction vectors "inplane" can be equal. In this case, adaptation of the reconstruction diameter can change the resolution width of the reconstructed image data with regard to all the reconstruction vectors which extend in the axial plane, so that there can then be considered to be a common "resolution width of the inplane reconstruction" for the reconstruction vectors in the axial plane direction.

By adapting the reconstruction region dimension, in particular the reconstruction diameter and thus the resolution width of the inplane reconstruction to the resolution width of the z-reconstruction, resolution widths can be achieved which are identical in the direction of all three above-mentioned reconstruction vectors. Therefore isotropic voxels are obtained in the reconstruction region in the aforementioned manner.

Alternatively or in addition to adapting the reconstruction region dimension or the reconstruction diameter, the automatic adaptation of the resolution width can also be carried out through adaptation of a "matrix size".

The matrix size is given by a field of rows and columns which renders the image data (in particular, in an X-ray projection process, Hounsfield values) in the axial plane of the reconstruction region. The matrix size is defined as the product of a row count or column count of the reconstructed image in the direction, in each case, of a reconstruction vector of the axial plane of the reconstruction region. In the case of an inplane reconstruction, wherein the corresponding reconstruction vectors are set, without restricting the generality thereof, equal to mutually orthogonal vectors in the x, y and z-direction (i.e. x and y are chosen to be orthogonal to the advancing direction z), the matrix size can be, for example 512×512, i.e. the image has 512 columns in the x-direction and 512 rows in the y-direction. Thus the matrix size corresponds to the number of image points in the plane mentioned for which a reconstruction is carried out.

The matrix size and the reconstruction diameter are variables which are to be set initially independently of one another, which can be individually determined for a reconstruction. However, for a reconstructed X-ray projection image, the following relation applies $$rd = mx \cdot vs_x \quad (1)$$

Here, rd represents the reconstruction diameter, mx is the column count, that is, the number of columns in the x-direction wherein, without restricting the generality thereof, a first reconstruction vector extends parallel to the spatial direction x which is oriented orthogonal to the system axis z. Furthermore, $vs_x$ gives the resolution width in the x-direction or in the direction of the first reconstruction vector. In this case, a row count my, which gives the number of rows in the y-direction, that is, in a spatial direction orthogonal to the x-direction and to the system axis z, can be identical. However, this does not preclude a different adaptation of the matrix size for mutually different, particularly orthogonal spatial directions or reconstruction vectors transverse to the system axis z. If the relevant matrix size or the column count mx or the reconstruction diameter rd are changed, then the resolution width $vs_x$ can be set such that it is identical to the resolution width vsz in the direction of the system axis z. In this way, isotropic voxels according to at least one embodiment of the invention can be achieved.

A further possibility for automatic adaptation of the resolution width lies in adapting or changing a pre-determined layer thickness transverse to the z-direction, particularly the layer thickness of the aforementioned primary layers. Preferably, the layer thickness is originally pre-determined on the basis of a detector element width in the z-direction. As mentioned above, the layer thickness can also be pre-determined by the movement of a detector in the advancing direction for recording the image information measurement data in relation to a patient, for example, if an overscan of the reconstruction region takes place.

In all the variants described, therefore, the parameters FoV dimension or reconstruction region dimension (particularly the reconstruction diameter), matrix size and layer thickness not previously coupled for reconstruction are adjusted dependent upon one another according to the invention such that the resolution widths in the different spatial directions are adapted to one another or are substantially identical, as desired.

In order to prevent image artifacts which are possibly generated by the adaptation, it is also advantageous that the reconstruction is carried out using a Moiré filter. For example, under particular circumstances, spatial frequencies from projection data can change due to the adapted resolution widths, so that aliasing effects, particularly, can come to light. These can be suppressed, particularly, with the aid of a Moiré filter. Accordingly, a reconstruction unit can also be configured for carrying out a reconstruction making use of a Moiré filter.

Preferably, the automatic adaptation is restricted by pre-determined parameter ranges for the values of the resolution widths. The parameter ranges can be defined, for example, by maximum or minimum resolution widths and particularly comprise the specification of minimum and/or maximum resolution widths in the direction of each of the reconstruction vectors. This is particularly advantageous if the reconstruction takes place on the basis—as aforementioned—of overscanned projection measurement data.

Through the limitation of the automatic adaptation of the resolution width by way of parameter ranges, an adaptation can be carried out such that the resolution width of a voxel (preferably in the z-direction) reaches at least the length or extent of a non-adapted voxel in the isocenter defined by the physical boundary conditions or the design of the detector, particularly the arrangement of the detector relative to the radiation source. It should be noted herein that the selection of the system parameters for carrying out the projection measurement already has a decisive influence on the possible adaptations of the resolution width. The system parameters selected for carrying out the projection measurement are also understood accordingly as physical boundary conditions. For example, with the aid of the system parameters, it could be specified that a plurality of pixels of the detector output a common detector signal so that the "relevant design" of the detector for the measurement can be altered electronically by grouping together detector signals with the aid of system parameters. Preferably, therefore, the system parameters for recording the projection measurement data can be specified such that the projection measurement data is recorded with the least possible restrictions regarding the adaptation of the resolution width. These settings are designated "generic system parameters". The generic system parameters can, for example, include that the aforementioned grouping of detector signals is prevented or that a maximum possible FoV of the detector for recording the projection measurement data is set.

Preferably, the reconstruction region can be selected by a user, particularly preferably with the aid of a user interface of the reconstruction unit. With the aid of a mouse or other suitable input device, for example, on an overview representation of the object under investigation, for example a simple projection topogram or image data (three-dimensional or sectional images) initially reconstructed in a conventional manner from the projection data, which is later also designated "preliminary reconstruction", can be marked and therefore selected. In this way, the image data which will later be made available for further processing or display can be selected by a user and the automatic adaptation can also be restricted to a reconstruction region which possibly deviates from the spatial region covered by the available projection measurement data, i.e. in particular, is smaller than the spatial region covered by the projection measurement data. In this way, advantages can be achieved in the speed with which the reconstructed image data is made available in the form of isotropic voxels.

Particularly advantageously, a resolution width can further be selected or specified by the user in at least one spatial direction or in the direction of a reconstruction vector. Particularly preferably, an adaptation of the resolution widths in the other spatial directions or in the direction of the other reconstruction vectors then takes place automatically. It should be emphasized in this regard that the automatic adaptation of the resolution width in a first direction to a resolution width in a second direction can, in turn, also comprise the one monitoring or checking of whether the resolution width in a third direction must be adapted or, if relevant, can be left in order to obtain isotropic voxels according to the selection or specification of the user.

The selection or specification of the resolution width is preferably carried out with the aid of a user interface of the reconstruction unit, which can also, for example, display or convey the aforementioned parameter ranges to the user.

Particularly preferably, the automatic adaptation of the at least one resolution width takes place while taking account of a transmission chain of the imaging system. This means that, in a CT system, for example, the reconstruction can take place taking into account the focus, the patient, the detector properties, the properties and design of the output electronics and, for example, an automatic pixel grouping of the detector. The transmission chain determines, for example, a transmission function of the imaging system which describes changes regarding the frequency information of the image data and specifies limits of the possible sharpness (i.e. any unsharpness possibly occurring) of the image data. Particularly preferably, for example, the previously described parameter ranges for the resolution widths are restricted, taking account of the transmission chain. It is therefore possible to select the resolution width such that it does not lie below a value which is, for example, in the order of magnitude of the blurring caused by the transmission chain or of an unsharpness of the voxel width at least in the direction of a reconstruction vector. Preferably, the maximum unsharpness which is determined by the transmission chain is taken into account when the resolution width is set. I.e. the minimum resolution width is greater than the maximum unsharpness caused by the transmission chain.

Usefully, the automatic adaptation should take place such that regions of an object under investigation or a patient to be imaged which are contained within the reconstruction region preferably selected by the user are contained within the reconstructed image data after automatic adaptation of the resolution width. In a particularly preferred manner, for this purpose, the method comprises a special checking step with the aid of which this is ensured. For this purpose, for example, before, after or during the automatic adaptation, body contours of the object under investigation or the patient can be recorded and evaluated.

Preferably, the reconstruction unit comprises a control interface with which the reconstruction region can be acquired or with which a reconstruction region selected by a user can be communicated to the reconstruction unit. For example, the control interface can also be configured to record a reconstruction mode command which specifies that an automatic adaptation of resolution widths should take place in order to obtain isotropic voxels.

Preferably, the reconstruction unit also comprises a warning device which is configured to output a warning signal if the automatic adaptation cannot be carried out according to a specification by the user or an automatic parameterization of the adaptation. This can be the case, for example, if the automatic adaptation of the resolution width undershoots the unsharpness of the pixels or voxels caused by the transmission chain or the described parameter ranges of the resolution width for automatic adaptation would have to be abandoned while taking account of the specification of a user for a desired resolution width. For example, a user can specify a desired resolution width and/or a reconstruction interval in the direction of the system axis z, which lie or lies significantly below a physically useful lower limit—described in detail below—for the resolution width. In this case, a suitable indication would be output.

FIG. 1 shows schematically a computed tomography system 1 with a reconstruction device 100 according to the invention. The CT system 1 essentially consists therein of a conventional scanner 2 in which a projection measurement data acquisition system 31 with a detector 30 and an X-ray source 15 opposite the detector 30 rotate on a gantry 10 about a measurement space 12. Situated in front of the scanner 2 is a patient table 20 the upper part 21 of which can be displaced, with a patient O situated thereon, relative to the scanner 2 in order to be able to move the patient O through the measurement space 12 relative to the projection measurement data acquisition system 31.

The scanner 2 and the patient table 20 are controlled by a tomograph control device 40 from which control data ST is emitted via a conventional tomography control interface 42 in order to control the system in a conventional manner according to pre-determined measurement protocols. By way of the movement of the patient O along the system axis z and the simultaneous rotation of the radiation source 15, a three-dimensional spatial region of the patient O can be recorded. In particular, during the scan, the X-ray source 15 can describe a helical trajectory relative to a fixed coordinate system defined in relation to the patient O. In this coordinate system, in the example embodiment, the reconstruction vectors $R_x$, $R_y$, $R_z$ are defined. The detector 30 acquires projection measurement data P1, . . . , Pk, which is transferred to a measurement data interface 44 of the tomograph control device 40. This projection measurement data P1, . . . , Pk is then further processed in the reconstruction device 100 which can be realized in the tomograph control device 40 in the form of software on a processor.

However, embodiments of the invention are not restricted to projection measurement data P1, . . . , Pk which has been acquired by way of a helical scan. For example, the projection measurement data P1, . . . , Pk can also comprise a plurality of sequential layer scans in sectional planes which, for example, can also extend in mutually different spatial directions through the patient O.

The method according to embodiments of the invention are, however, also in principle usable in other CT systems, for example, with a detector forming a complete ring, or a plurality of radiation sources and/or detectors, particularly also in dual-energy operation.

The reconstruction device 100 has, as shown enlarged in FIG. 1, an input interface 110 for acceptance of the X-ray CT data sets, that is, the projection measurement data P1, . . . , Pk. With the aid of a reconstruction processor 130, the reconstruction according to an embodiment of the invention takes place in the reconstruction device 100.

The finished reconstructed computed tomography volume image data BD is then passed to an output interface 140 which then stores the generated volume image data BD, for example, in a memory store 45 of the tomograph control device 40 and/or transfers the data for output on the screen or a user interface GUI of the tomograph control device 40. Furthermore, the volume image data BD can be fed by way of the output interface 140 into a network connection 6 connected to the computed tomography system 1, for example, a radiological information system (RIS) or another medical image processing system, for example, PACS, or can be stored in mass storage media provided there or can be output to printers connected thereto. The data BD can also be further processed in any desired manner, for example, for the aforementioned segmentation and then, if relevant, stored or output.

In the present example embodiment, a user can select a reconstruction region RA. The reconstruction region RA relates herein to a three-dimensional spatial region in which image data BD are to be reconstructed. The spatial region is described by the aforementioned reconstruction vectors $R_x$, $R_y$, $R_z$ which, in the example embodiment, form an orthogonal generator system of the reconstruction region RA, that is, the reconstruction region RA is fixedly spatially associated with the patient P. The reconstruction vector $R_z$ extends parallel to the system axis z and the two further reconstruction vectors $R_x$ and $R_y$ extend parallel to the spatial directions x and y of the orthogonal position space system x, y, z.

Before, during or after the selection of the reconstruction region RA, the user can specify whether a reconstruction according to the invention should take place with isotropic voxels. Both the specification of the reconstruction region RA and the selection of an "isotropic voxel reconstruction" can take place with the aid of a user interface GUI of the terminal 5 or of the tomograph control device 40. The reconstruction region RA and the associated reconstruction vectors $R_x$, $R_y$, $R_z$ and/or information concerning the spatial directions are communicated to a control interface 120 of the reconstruction device 100.

On selection of a reconstruction with isotropic voxels, a reconstruction mode command T is also communicated to the control interface 120 of the reconstruction unit 100 so that the reconstruction unit then carries out the reconstruction on the basis of the reconstruction method, which is described in greater detail below. The following description is based on the preferred example that isotropic voxels, that is, voxels which have substantially the same resolution width in all three position space directions are to be generated.

The user can also specify a desired resolution width for the isotropic voxels with the aid of the terminal 5 or the graphical user interface GUI which is formed, for example, by a touch screen and herein, for example, a plurality of desired resolution widths can be input for a plurality of reconstructions carried out one after another. Alternatively, the desired resolution widths or the reconstruction region RA can be stored, for example, in a definition database which is then read in or recorded for reconstruction by the reconstruction unit 100. In this way, a fully automatic control of the reconstruction, for example, in the form of "batch operation" can be achieved with the aid of a control protocol which contains one or more definition data sets. Regardless of whether this data was input with the aid of the user interface GUI or were taken from a definition data set, the relevant data can be recorded with the aid of the control interface 120 and made available to the reconstruction processor 130, for example, also via the input interface 110.

The reconstruction device 100 is configured in this example embodiment to compare the resolution width with pre-determined parameter ranges. The pre-determined parameter ranges define upper and lower limits for the automatic adaptation of the resolution width. The pre-determined parameter ranges can be specified by a user or can be determined automatically. For example, the pre-determined parameter ranges can also be included in the definition data set or made available separately, particularly by way of the input interface 110, for example, also through input by way of the user interface GUI. The automatic determination of the pre-determined parameter ranges will now be described in greater detail.

Furthermore, by way of the output interface 140 or, for example, by way of a warning device 145 which is directly controlled, i.e. possibly also circumventing the output interface 140, for example a loudspeaker, a warning signal W can be emitted which makes known that adaptation of the resolution widths with isotropic voxels according to a specification, particularly with regard to the aforementioned parameter ranges, was not possible automatically. I.e. a warning signal W is output, in particular, based on the aforementioned comparison of the user specifications with the pre-determined parameter range.

In order to prevent or minimize image artifacts which possibly occur in the process of the automatic adaptation, the reconstruction device 100 and particularly the reconstruction processor 130 are configured such that the reconstruction can take place with the aid of filters, in particular a Moiré filter. The user can, for example, also select via the user interface GUI whether a corresponding filter is to be used for reconstruction.

There follows a more detailed description of the reconstruction method according to an embodiment of the invention insofar as it deviates from a conventional reconstruction, making reference to the representations and example embodiments of FIGS. 2 to 6.

Figure 2:
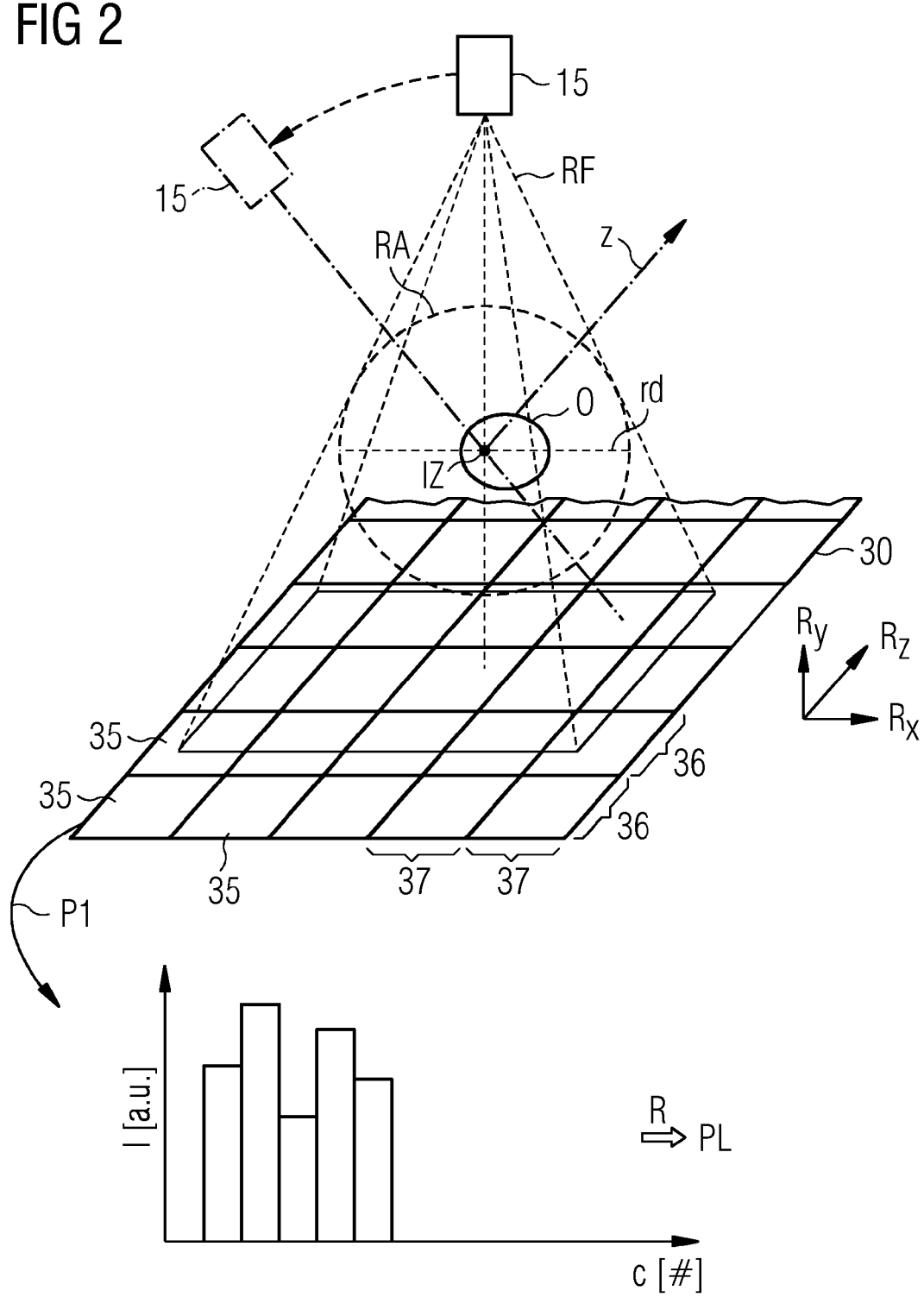
FIG. 2 is a schematic representation of the geometry of the X-ray device and detector arrangement of the imaging system of FIG. 1, FIG. 3 contains example embodiments for changing the resolution widths in relation to an inplane reconstruction, FIG. 4 contains example embodiments for changing the resolution widths in relation to a z-reconstruction.

FIG. 2 firstly makes clear the aforementioned "hardware-dependency" of the aforementioned first, second and third voxel widths.

Modern X-ray detectors 30 typically have a plurality of detector elements 35 which, in the example embodiment, are arranged matrix-like in a plurality of detector rows 36 and a plurality of detector columns 37. The detector elements 35 acquire projection measurement data P1, which is shown, by way of example, and as an extract, for one detector row 36 in a graphical representation shown in the lower region of FIG. 2. The graphical representation shows, on the vertical axis, the measured intensity values for a plurality of detector elements 35 in the detector row 36 at a particular time point. An individual measuring channel is associated with each detector element 35, the channel number c thereof forming the horizontal axis. During a rotation of the gantry, such projection data P1 from a particular volume which contains the reconstruction region RA is generated in rapid sequence from different angular directions.

The projection data P1 recorded is then used for a reconstruction R of the desired volume image data in the reconstruction region RA. The volume image data has individual voxels with a preferably cuboid form wherein the edges of the cuboid extend in the directions of the reconstruction vectors $R_x$, $R_y$ and $R_z$.

The reconstruction diameter rd, i.e. the diameter of the reconstruction region RA, is typically initially set equal to the FoV of the detector 30 and is determined, in relation to a sectional area of X-ray cones or fans, transverse to the system axis z, which are transmitted at different time points during the rotation of the X-ray source 15 about the measurement space in the direction of the object under investigation O and are seen by the detector 30. This rotation of the X-ray source 15 is marked dashed and, in each case, a "central ray" of the corresponding X-ray fan is drawn in, in order to indicate a change in the X-ray fan over the time of the rotation. The reconstruction diameter rd is initially defined by the dimensions of the computed tomography system, and thus "hardware-dependently".

The first and second voxel width, i.e. the edge length of the reconstructed voxels in the $R_x$ and $R_y$ direction, perpendicular to the system axis z, is determined by the aforementioned reconstruction diameter rd and the number of the voxels reconstructed in relation to the sectional area, which as mentioned, is given by a matrix size.

The third voxel width vsz can also be pre-determined "hardware-dependently", for example, by the dimensions of one or more grouped-together detector elements 35 in the direction of the system axis z. What is relevant herein is a "scaling factor" which is given by the ratio of the distance of the detector elements 35 from the X-ray source 15 to the distance of the patient O (or of the isocenter IZ, if the patient O is arranged in the region of the isocenter IZ) from the X-ray source 15. The dimension of one or more grouped-together detector elements 35 scaled by the scaling factor can then pre-determine the voxel width in the z-direction. The aforementioned layer thickness or third voxel width can also be pre-determined with a reverse-calculated detector collimation in relation to the isocenter IZ with the aid of the scaling factor; in the following, the expression "detector collimation" therefore relates to a reverse-calculated resolution width in the direction of the system axis z which is determined by an opening of a collimator for delimiting the X-ray radiation in relation to the detector.

Furthermore, the third voxel width can be determined by way of the aforementioned overscanning of the reconstruction region RA. The third voxel width is then defined dependent on the step width of the advance.

Figure 3:
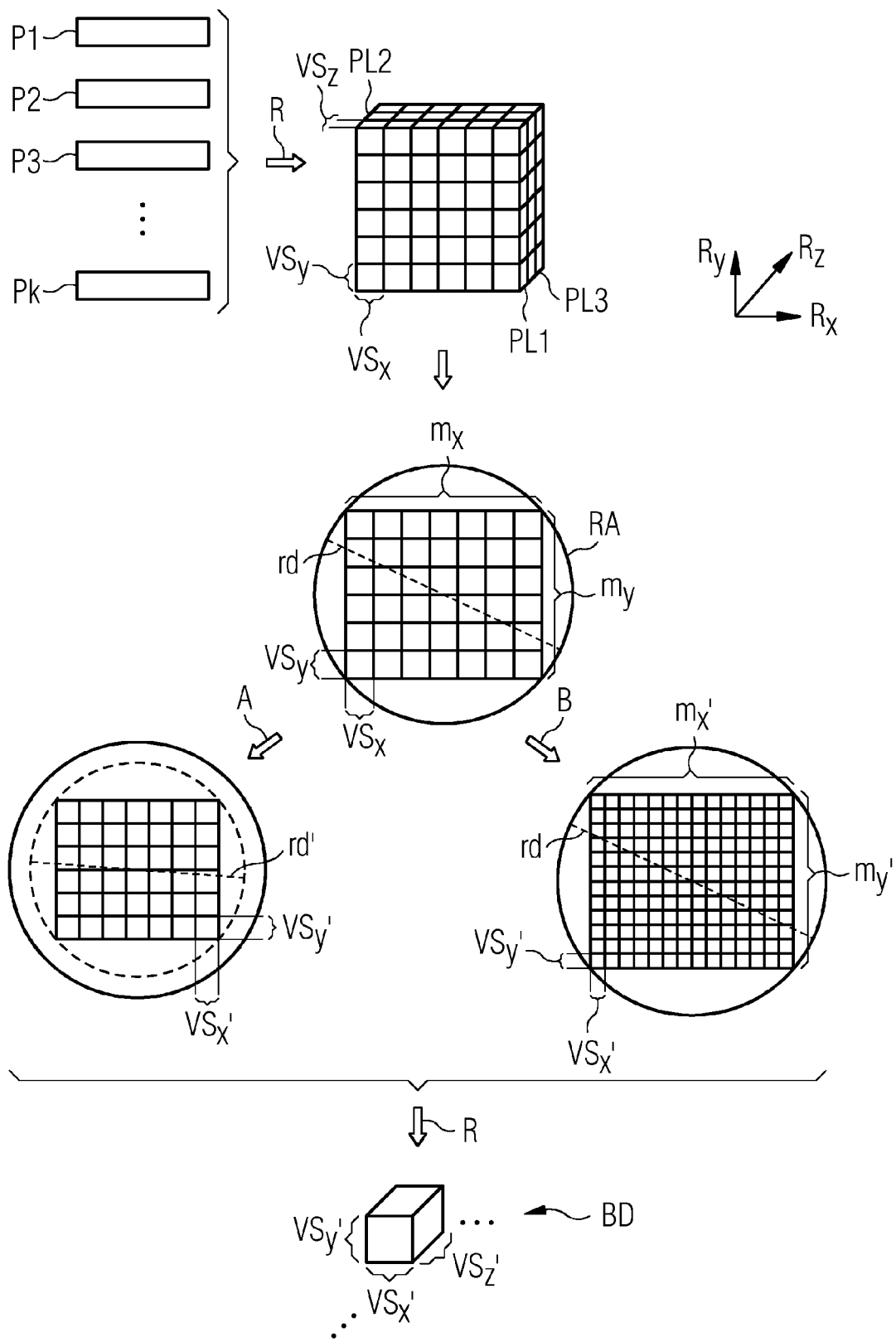

FIG. 3 shows the use of possible steps of a reconstruction method according to the invention for the reconstruction of volume image data BD with isotropic voxels on the basis of the projection measurement data P1, . . . , Pk. As indicated by a first arrow representing a reconstruction R, starting from the projection measurement data P1, . . . , Pk (shown at top left), firstly, a plurality of primary layers PL1, PL2, PL3 are each reconstructed with voxels of a pre-determined first, second and third voxel width $vs_x$, $vs_y$, $vs_z$. I.e. a preliminary reconstruction takes place—as previously described in relation to FIG. 2—with voxels which define a cuboid of space the edges of which extend in the direction of the reconstruction vectors $R_x$, $R_y$, $R_z$, wherein the edges have a length corresponding to the first, second or third voxel width $vs_x$, $vs_y$, $vs_z$. This reconstruction takes place with any desired conventional method, for example a filtered back-projection.

As schematically indicated, this involves primary layers PL1, PL2, PL3, which are not formed from isotropic voxels and wherein the pre-determined first, second and third voxel widths $vs_x$, $vs_y$, $vs_z$ are pre-determined as described in relation to FIG. 2. Based on the preliminary reconstruction of the primary layers PL1, PL2, PL3, the possibility then exists of specifying particularly simply a final reconstruction with isotropic voxels. However, the preliminary reconstruction is merely an optional method step.

Regardless of whether a preliminary reconstruction is carried out or not, a user can specify, for example, that the desired resolution widths $vs_x'$, $vs_y'$ in the x and y-direction should be adapted to an already pre-determined third voxel width $vs_z$ in the direction of the $R_z$ reconstruction vector in order to obtain isotropic voxels. I.e. the desired resolution width $vs_z'$ ($=vs_x'=vs_y'$) of the isotropic voxel is equal to the initial resolution width vsz which, in turn, can be pre-determined system-dependently by the detector collimation is set. It is therefore necessary to adapt the first and second voxel widths $vs_x$, $vs_y$ of the inplane reconstruction accordingly.

Figure 4:
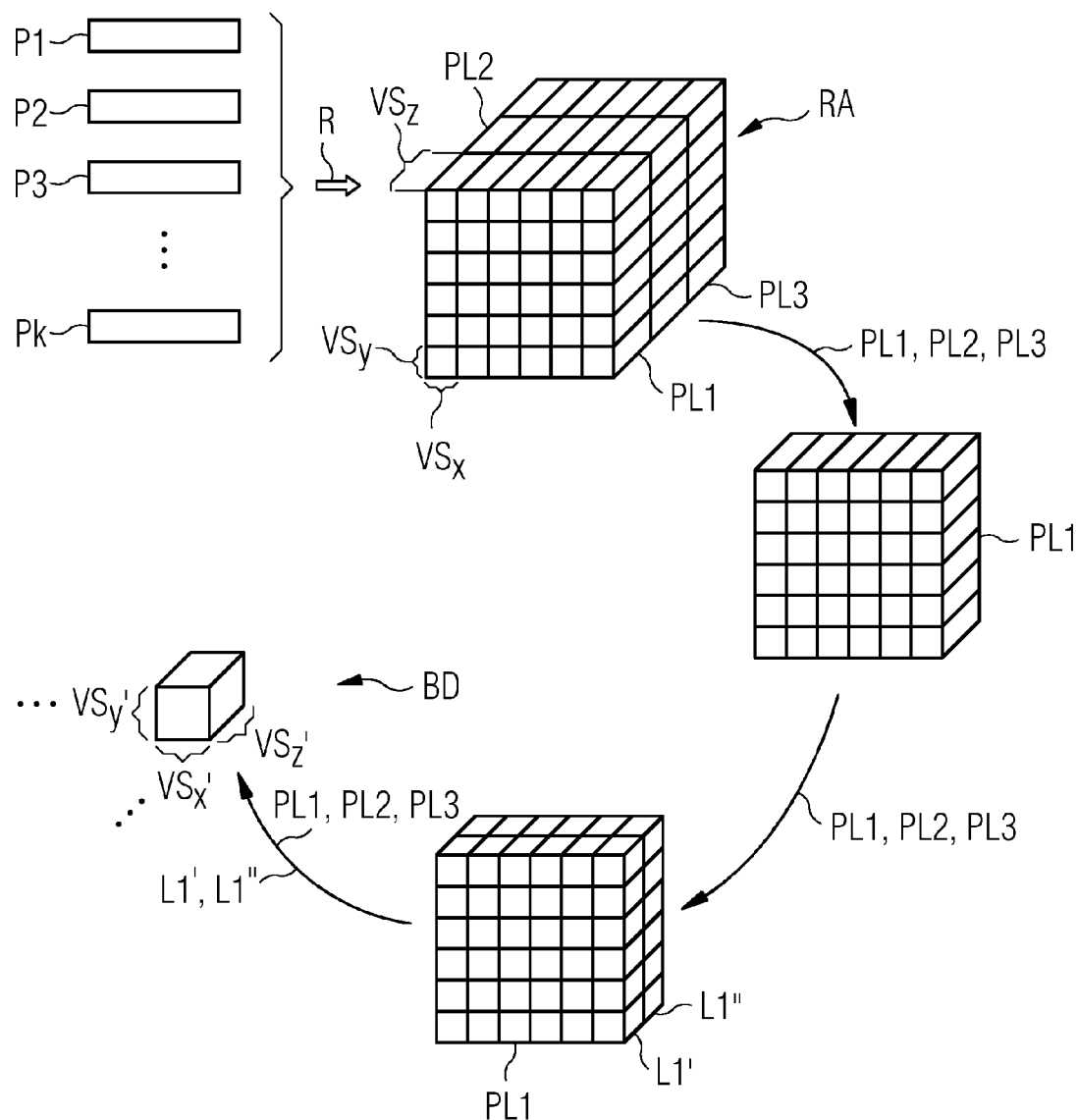

This is also illustrated in FIG. 4, starting from the primary layers PL1, PL2, PL3 following another arrow (pointing downwardly therefrom).

Typical first, second and third voxel widths $vs_x$, $vs_y$, $vs_z$ for the existing primary layers PL1, PL2, PL3, given a matrix size ms of mx×my=512×512, a field of view or reconstruction region RA with a 500 mm reconstruction diameter rd and a detector collimation of 0.6 mm, are 0.98 mm×0.98 mm×0.6 mm.

In order to adapt the inplane reconstruction, a matrix size ms or the reconstruction diameter rd can be changed, optionally individually or in combination, as shown for a first variant A (bottom left) and a second variant B (bottom right).

According to variant A, the reconstruction could be carried out with the matrix size $m_s$ unchanged and the resolution width $vs_z$ unchanged, but with an automatically adapted smaller reconstruction diameter rd', as schematically indicated with dashed lines.

In the process of the automatic adaptation of a resolution width, an adapted reconstruction diameter rd' can be calculated as follows:

$$rd'=vs_z \cdot m_x \quad (2)$$

Herein, $vs_z$ is the pre-determined, i.e. in this case unchanged, resolution width in the direction of the system axis z and $m_x$ is the column count in the direction of the reconstruction vector $R_x$. Alternatively, for example, the row count my in the direction of the reconstruction vector $R_y$, can be used. Therefore, with a matrix size of 512×512 image points and a desired detector collimation of 0.6 mm and a reduction of the reconstruction diameter rd from 500 mm to the reconstruction diameter rd' of 307 mm, an edge length of the reconstructed voxels of 0.6 mm×0.6 mm×0.6 mm results, and therefore isotropic voxels.

If the reconstruction diameter rd cannot be changed as automatically determined or desired because, for example, image information of an object under investigation would be cut off, the possibility exists, additionally or alternatively, to use variant B to change the inplane reconstruction. In this process, particularly, truncation effects can be avoided, i.e. regions of the patient which are included in the images before the automatic adaptation are also included therein after the automatic adaptation.

If, for example, the reconstruction diameter rd is marked by a user as a fixed pre-determined variable, i.e. the desired reconstruction diameter rd' corresponds to the initial reconstruction diameter rd or the initial reconstruction diameter rd is only adjustable to a limited extent to a reconstruction diameter rd', in contrast to the usual fixed specification, the matrix size ms can also be automatically adapted in order to obtain isotropic voxels.

If, for example, the resolution width $vs_z$ is pre-determined, than an adapted column count $m_x'$ can then be calculated as follows:

$$m_x'=rd/vs_z \quad (3)$$

Alternatively, in equation (3), a previously adapted reconstruction diameter rd' can also be used. If, for example, the resolution widths $vs_x$, $vs_y$ differ in the $R_x$ and $R_y$ direction, this adaptation could also take place, for example, for the adapted row count $m_y'$ in respect of the resolution width $vs_x$ or $vs_z$. It follows that $$m_y'=rd/vs_z \quad (4)$$

or $$m_x'=rd/vs_y \quad (5)$$

The resolution width $vs_x'$ adapted according to equation (3) is identical in this case to the resolution width $vs_y$ or $vs_z$.

According to the example embodiment of FIG. 3, an initial detector collimation of 0.6 mm and a reconstruction diameter rd of 500 mm is pre-determined. According to equation (3), as schematically indicated in variant B, for example, the column count $m_x$ and the row count $m_y$ of 512 can be increased to an adapted column and row count $m_x'$, $m_y'$ of 833. With the reconstruction diameter rd of 500 mm, therefore, adapted resolution widths $vs_x'$, $vs_y'$ of 0.6 mm are reached and the reconstruction leads to isotropic voxels.

Apart from the modification possibilities of the inplane reconstruction as described, the z-reconstruction can also be amended in order to obtain isotropic voxels. This variant is shown in FIG. 4.

For example, the inplane resolution width $vs_x$, $vs_y$ can be pre-defined by a user according to the system-dependent resolution widths and thus the matrix size ms or also the reconstruction diameter rd can be defined. FIG. 4 shows, inter alia, a primary layer PL1 which has been reconstructed on the basis of a relatively broad detector collimation of 1.2 mm. As specified by a user, the inplane resolution widths $vs_x$, $vs_y$ each remain unaltered. These are based herein on a matrix size ms of 512×512 at a reconstruction diameter of 307 mm. In this case, the possibility exists of calculating and specifying the desired resolution width $vs_z'$ for the z-reconstruction as follows, making use of the column count $m_x$:

$$vs_z'=rd/m_x \quad (6)$$

Naturally, this calculation can also be carried out with the aid of the row count $m_y$ so that, in both cases a desired resolution width $vs_z'$ for the z-reconstruction of 0.6 mm is obtained.

If the number of columns and rows in the reconstruction matrix is, for example, not equal, then the desired resolution width $vs_z'$ can simply be set to a selected pre-determined resolution width $vs_x$, $vs_y$ of the inplane reconstruction, for example $$vs_z'=vs_x \quad (7)$$

or $$vs_z'=vs_y \quad (8)$$

In the example embodiment shown, with these calculations or stipulations, in place of the primary layer PL1 with resolution widths of 0.6×0.6×1.2 mm, two layers L1', L1" with respective resolution widths of 0.6×0.6×0.6 mm are reconstructed which contain, overall, the identical image information.

Thus, with one or the combination of a plurality of the possibilities described in relation to FIGS. 3 and 4 for changing the resolution widths $vs_x$, $vs_y$, $vs_z$ a reconstruction R can be carried out over the entire reconstruction region RA with the aid of identical resolution widths $vs_x'$, $vs_y'$ and $vs_z'$ automatically adapted to one another.

The image data reconstructed in the manner according to the invention can have different quality depending on the specification of the reconstruction parameters by the user, for example, the reconstruction diameter, layer thickness, matrix size, etc. The invention can therefore be further improved in that the user receives specification assistance for the selection of reconstruction parameters.

Figure 5:
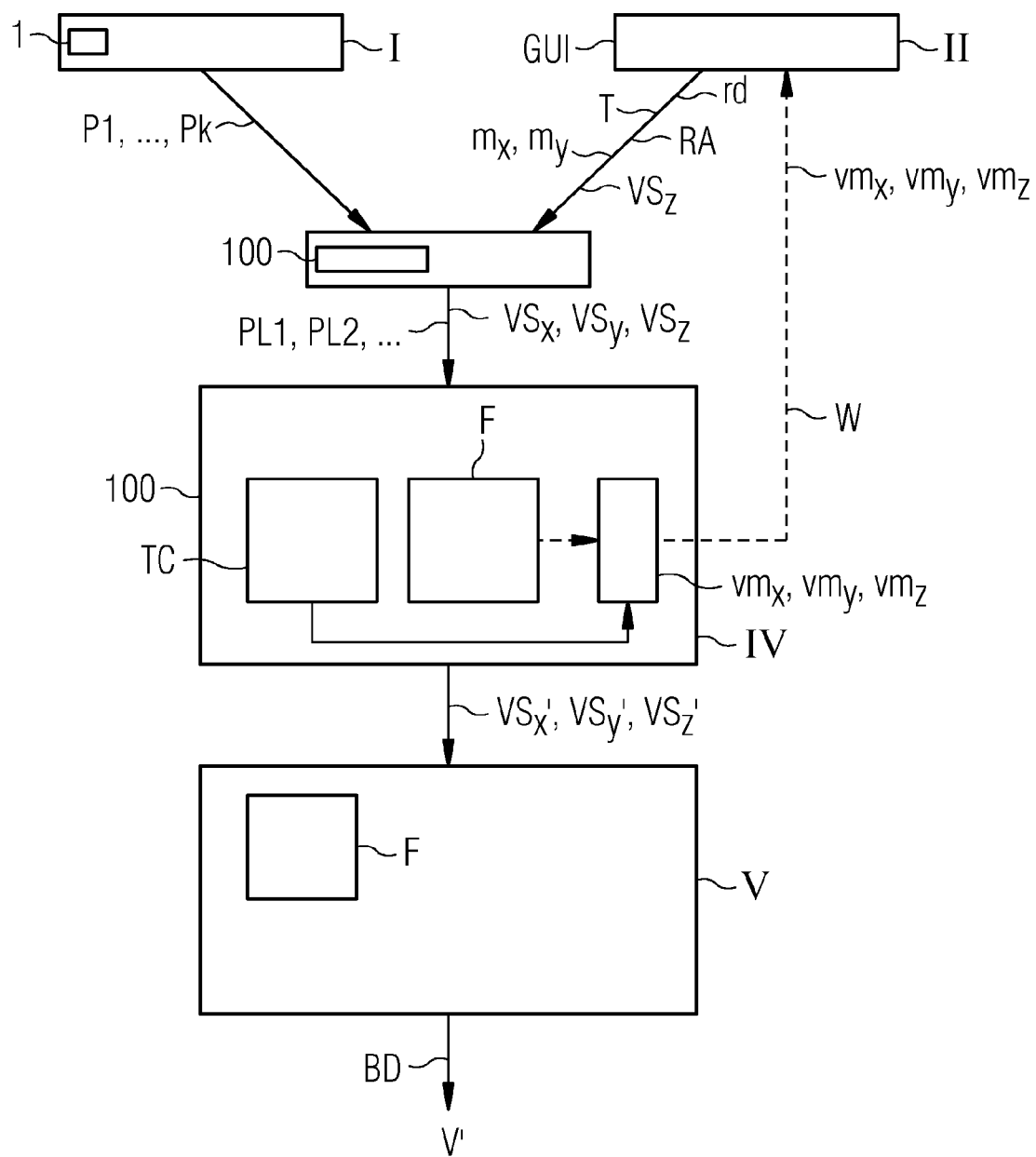
FIG. 5 is a flow diagram of a reconstruction method wherein isotropic voxels are generated.
Figure 6:
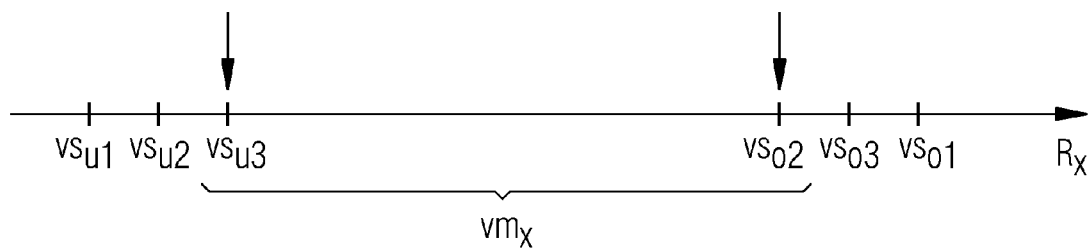
FIG. 6 is the generation of pre-determined parameter ranges.

FIG. 5 describes a possible process sequence for the reconstruction of image data according to the invention with the aid of a flow diagram.

In a first step I, with the aid of an imaging system 1, a set of projections P1, ..., Pk of a patient or of a partial region of the patient is recorded. In a further step II, a user can select a reconstruction region RA with the aid of a graphical user interface GUI. This can take place, for example, by schematic representation of the patent, for example, on the basis of a generic preliminary reconstruction or a topogram representation. "Generic" in this case means that initially a fixed pre-determined reconstruction region, which is based, for example, on generic system parameters, is used.

The reconstruction region RA now selected by the user and the projection measurement data P1, ..., Pk are communicated to a reconstruction device 100 which can, for example, also carry out the preliminary reconstruction.

In a subsequent step III, the reconstruction device 100 generates "primary layers" PL1, PL2, . . . on the basis of the selected reconstruction region RA. These primary layers PL1, PL2, . . . are initially reconstructed dependent on the physical properties of the imaging system or of a corresponding detector, i.e. for example, the resolution width in the direction of the system axis z can be pre-determined by the detector collimation vsz. Furthermore, the resolution widths $vs_x$, $vs_y$ of the inplane reconstruction can be determined by the matrix size ms used and a reconstruction diameter rd determined by the selected reconstruction region RA.

On the basis of these reconstructed primary layers PL1, PL2, PL3, in subsequent steps IV and V, image data BD which has isotropic voxels V' can now be generated automatically. For this purpose, particularly the amendment possibilities of the inplane reconstruction can be used as described in relation to FIG. 3 or for the z-reconstruction as indicated in relation to FIG. 4.

With the aid of the graphical user interface GUI, the user also gives a reconstruction mode command T in step II which initiates the reconstruction based on the method according to the invention, with isotropic voxels.

The reconstruction takes place with a filtered back-projection. A Moiré filter F can be used herein, for example, to suppress aliasing effects. This is particularly advantageous since during the automatic adaptation of the resolution widths $vs_x'$, $vs_y'$, $vs_z'$, changed spatial frequencies can result, so that the aliasing effects can, under some circumstances, be particularly pronounced. Preferably, the use of the Moiré filter F is therefore considered if the resolution width of the inplane reconstruction is adapted. The Moiré filter F acts similarly to a low pass filter for the spatial frequencies so that only the actually representable spatial frequencies pass the low pass. "Actually representable" in this case means that the Moiré filter F limits the spatial frequencies of the projection measurement data according to the sampling theorem with the aid of the Nyquist-Shannon condition, wherein the limit. frequency of the low pass filter is the Nyquist-Shannon frequency.

In step IV, for this purpose, based on particular specifications, a desired resolution width, for example $vs_z'$ of the isotropic voxels is selected by a user or is automatically determined. These specifications can be made in numerous ways, although they can have a great significance for the quality of the reconstructed volume image data BD. For example, the user can specify a reconstruction diameter rd or a resolution width $vs_z$ in the direction of the system axis. The possibility also exists that a matrix size $m_s=m_x \times m_y$ is pre-determined.

The desired resolution width selected or determined in step IV can, in particular, be selected in a preferably interactive method and/or optimized according to different aspects. For example, the optimization can take place with regard to the representation of the image data, such that an optimum resolution width can be determined regarding the representation with the aid of a "volume rendering technique (VRT)" method or a "multi-planar reformatting (MPR)" method. The optimum resolution width determined based on the desired presentation can then be selected as the desired resolution width of the isotropic voxels. For each of the methods mentioned, for example, an optimum resolution width can be made available automatically. Furthermore, an optimization of the desired resolution width can take place according to clinical considerations. If, for example, a particular pathology is to be specifically investigated, the resolution width in a particular spatial direction can be decisive for achieving the required analysis accuracy and simultaneously for masking out unwanted information. The desired resolution width is then specified according to an optimum resolution width for the pathology to be investigated. It is herein conceivable that for the optimization regarding the imaging and with regard to the pathology under investigation that the optimum resolution widths are given, for example in a database for the respective pathology or the respective imaging method and are automatically made available for the reconstruction of isotropic voxels.

Since, as mentioned, the image quality can be severely altered by the specifications, it is extremely advantageous if the specifications are restricted to useful selection possibilities. The limitation of the selection possibilities can be based on specified or determined parameter ranges $vm_x$, $vm_y$ and $vm_z$ which are limited by maximum or minimum values for the resolution width in the $R_x$, $R_y$ and $R_z$-direction. These parameter ranges $vm_x$, $vm_y$ and $vm_z$ can, as indicated. dashed, be displayed or made known to the user, for example, together with the representation of the reconstruction region RA with the aid of the user interface GUI, so that as early as step II, the user can take account of the pre-determined parameter ranges $vm_x$, $vm_y$ and $vm_z$ with their lower and upper limits of the resolution width $vs_x'$, $vs_y'$, $vs_z'$ in his specifications.

Herein, different factors can be used in an automatic determination of the lower and upper limits of the resolution widths $vs_x'$, $vs_y'$, $vs_z'$, i.e. for determining the selectable parameter ranges $vm_x$, $vm_y$ and $vm_z$.

In order to set lower and upper limits of the resolution width $vs_x'$, $vs_y'$, $vs_z'$, firstly, physical parameters of the CT system can be observed or determined. The physical parameters are, for example, the detector element width or the detector element collimation, the separation of the detector or the object under investigation from the X-ray source, the focus of the X-ray source, in particular, the scaling factor, the advance of the patient or of the gantry in the direction of the system axis or the initial FoV. On the basis of the observed physical parameters, a physically useful geometry-dependent lower or upper resolution width is calculated, each in the direction of the respective reconstruction vectors. The lower geometry-dependent resolution width $vs_{u1}$ determined on the basis of one or more of the aforementioned physical parameters is, for example, 0.5 mm and the correspondingly determined physically useful upper resolution width $vs_{o1}$ is, for example, 1.5 mm.

In addition, a deviation of the resolution width of reconstructed primary layers in the direction of the system axis z from the detector collimation could also be determined. For example, the extent of the primary layer in the z-direction can deviate from the detector collimation due, apart from the aforementioned overscanning, to various effects such as, for example, a particular acquisition method (e.g. the aforementioned acquisition of the projection measurement data by way of a sequential method or a helix trajectory and whether a greater or lower pitch has been set for the helix trajectory) or a particular reconstruction kernel (for later filtered back-projection). For example, in the case of an overscan, a reformatting of the reconstructed primary layers must necessarily take place. I.e. interpolation methods are used which reconstruct the layers with a desired reconstruction interval. From the deviation of the third voxel width relative to the detector collimation, a lower or upper reconstruction-dependent resolution width $vs_{u2}$, $vs_{o2}$ can again be determined which, for example, in the case of the lower limit, is 0.6 mm and in the case of the upper limit is 1.4 mm and, in particular, permits the necessary reformatting.

Furthermore, the influence of the transmission chain TC of the imaging system could also be determined and, from this, a lower or upper transmission chain-dependent resolution width $vs_{u3}$, $vs_{o3}$ can be determined. The transmission chain TC can be determined, for example, by the detector collimation, the grouping of pixels of the detector, the patient or the section of the object under investigation to be imaged, the focus of the X-ray radiation, the evaluation electronics of the detector, the reconstruction kernel or the like, and as a result, can create a particular blurring of the reconstructed layer. This influence is defined by the "transfer function", so that blurring of the projection measurement data can be calculated with the aid of the transfer function. The blurring can, in turn, represent a lower limit $vs_{u3}$ for the determination of the resolution widths. This blurring can also be relevant for an upper limit of the resolution width $vs_{o3}$. In the example, taking account of the influence of the transmission chain TC, there results, in particular, a lower transmission chain-dependent resolution width $vs_{u3}$ of 0.65 mm, and an upper transmission chain-dependent resolution width $vs_{o3}$ amounts to, for example, 1.55 mm.

Furthermore, for the factors matrix size and column count and/or row count, reconstruction diameter, detector collimation or reconstruction filter (i.e. the Moiré filter), in each case, separate matrix size-dependent, column or row-dependent, reconstruction diameter-dependent, collimation-dependent or filter-dependent lower and upper resolution widths can be determined and taken into account.

On the basis of the different lower and upper resolution widths $vs_{u1}$, $vs_{u2}$, $vs_{u3}$, $vs_{o1}$, $vs_{o2}$, $vs_{o3}$, the pre-determined parameter ranges can subsequently be specified and determined. This is shown, by way of example, in FIG. 6 for the parameter range $vm_x$, which is associated with be reconstruction vector $R_x$. In an identical manner, this can also be performed for the further reconstruction vectors $R_y$, $R_z$, and the corresponding parameter ranges $vm_y$, $vm_z$.

From the lower resolution widths $Vs_{u1}$, $vs_{u2}$, $vs_{u3}$ taken into account, the largest resolution width $vs_{u3}$ is selected. This forms the lower limit of the parameter range $vm_x$. In a corresponding manner, from the above resolution widths $vs_{o1}$, $vs_{o2}$, $vs_{o3}$, the smallest resolution width $vs_{o2}$ is then selected as the upper limit of the parameter range $vm_x$, as marked in each case by corresponding arrows.

As indicated in FIG. 5, in the method, the setting or selection of the desired resolution width $vs_x'$, $vs_y'$, $vs_z'$ is limited to the respective corresponding determined parameter ranges $vm_x$, $vm_y$, $vm_z$. In these parameter ranges $vm_x$, $vm_y$, $vm_z$, for example, by limiting the change of the reconstruction diameter rd, it can be taken into account that no truncation artifacts should occur. I.e., particular, regions of the patient should not be cut off unintentionally or automatically. For example, taking into account and checking whether a truncation occurs is possible with the aid of an automatic recording of a body contour or a body structure of the patient. The setting of a functional mode for preventing truncation effects using an automatically recorded body contour or body structure can then lead to the automatic stipulation of upper or lower truncation-dependent resolution widths which can be taken into account in the determination of the parameter ranges $vm_x$, $vm_y$, $vm_z$, as described in relation to FIG. 6. As mentioned, the parameter ranges $vm_x$ can be used as an input aid to the user in an interactive method for setting the desired resolution width $vs_x'$, $vs_y'$, $vs_z'$. However, if the user attempts to set a desired resolution width $vs_x'$, $vx_y'$, $vs_z'$ which lies outside the pre-determined parameter ranges $vm_x$, $vm_y$, $vm_z$, i.e. if, for example, a truncation artifact were to arise, the reconstruction unit 100 emits a warning signal W way of the warning unit. mentioned in relation to FIG. 1. Preferably, for this purpose, for example, in the representation of the reconstruction region RA, with the aid of the GUI, the portion of the reconstruction region RA which would not be reconstructed with the desired resolution width $vs_x'$, $vs_y'$, $vs_z'$ as set can be marked.

Alternatively or additionally, within these parameter ranges $vm_x$, $vm_y$ and $vm_z$, a suitable resolution width that is optimum for reconstruction can be determined automatically. Herein, minimizing the resolution width can be pre-determined as the optimization target. I.e., for this purpose, in the pre-determined parameter ranges, for example, the smallest resolution width is selected. Other optimization aims are also conceivable, for example, the optimization can take place—as mentioned—on the basis of detection limits for pathologies or with regard to a preferred imaging method, for example, VRT or MPR. It is herein possible that the universally scalable image data is generated with an optimum reconstruction speed so that, overall, a very efficient "workflow" can be achieved.

Finally, in step V, using the Moiré filter F, a reconstruction of three-dimensional image data BD can take place fully automatically with isotropic voxels V' and with the resolution width $vs_x'$, $vs_y'$, $vs_z'$, either optimized or as desired by the user.

From the description above, it is clear that the invention provides possibilities in an effective manner in order to improve decisively the reconstruction of image data on the basis of projection measurement data. It should be noted that the features of all the example embodiments or of the developments disclosed in the drawings can be used in any combination. Finally, it should also be noted that in the method for reconstructing multidimensional images in the reconstruction unit, as described above in detail, in the imaging system or in the computer program product are merely example embodiments which can be modified by a person skilled in the art in a variety of ways without departing from the scope of the invention. The use of the indefinite article "a" or "an" also does not preclude that the relevant features can also be present plurally. Similarly, the expression "unit" and "module" does not preclude the relevant components consisting of a plurality of cooperating partial components which can also be spatially distributed.

Reference Signs
1 CT system
2 Scanner
5 Terminal/output unit
6 Network connection
10 Gantry
12 Measurement space
15 X-ray source
20 Patient table/couch
21 Upper part of patient table
30 Detector
31 Projection measurement data acquisition system
35 Detector element, detector pixel
36 Detector row
37 Detector column
40 Tomograph control device
42 Tomograph control interface
44 Measurement data interface
45 Memory store
100 Reconstruction unit
110 Input interface 120 Control interface
130 Reconstruction processor
140 Output interface
145 Warning device
BD Image data/volume image data
F Filter
GUI User interface/graphical user interface
IZ Isocenter
A, B Adaptation variants
I, II, III, IV Method steps
M Reconstruction matrix/image matrix
$m_x$, $m_x'$ Column count
$m_y$, $m_y'$ Row count
O Object under investigation
P1, . . . , Pk Projection measurement data/X-ray projection data
PL1, PL2, PL3 Primary layer
L1', L1" Reconstructed layer
Reconstruction
RA Reconstruction region
RF X-ray fans
rd Reconstruction diameter
$R_x$, $R_y$, $R_z$ Reconstruction vector/spatial direction
ST Control data
T Reconstruction mode command
TC Transmission chain
$vm_x$, $vm_y$, $vm_z$ Parameter ranges
$vs_x$ Resolution width/first voxel width
$vs_y$ Resolution width/second voxel width
$vs_z$ Resolution width/third voxel width
$vs_x'$, $vs_y'$, $vs_z'$ Adapted/desired resolution width
$vs_{u1}$, $vs_{u2}$, $vs_3$ Lower resolution width
$vs_{o1}$, $vs_{o2}$, $vs_{o3}$ Upper resolution width
V Voxel
V' Isotropic voxel
W Warning signal
x, y Spatial direction
z system axis/spatial direction

The invention claimed is:

1. A method for the multidimensional reconstruction of image data in a reconstruction region on the basis of projection measurement data generated by a medical imaging system, the method comprising:
reconstructing the image data in three mutually different spatial directions, the three mutually different spatial directions being a first spatial direction, a second spatial direction and a third spatial direction, the first spatial direction associated with a first resolution width, the second spatial direction associated with a second resolution width and the third spatial direction associated with a third resolution width;
determining a deviation between the third resolution width and a detector collimation;
determining an upper resolution limit and a lower resolution limit based on the deviation; and
adapting at least one of the first and second resolution widths to be substantially identical to the third resolution width and in accordance with the upper resolution limit and the lower resolution limit and the adapted resolution width is at least a length of a non-adapted voxel in an isocenter of the medical imaging system.

2. The method of claim 1, wherein the adapting adapts the reconstruction region dimension and the reconstruction region is for a plane of the reconstruction region.

3. The method of claim 2, wherein the adapting adapts a reconstruction diameter which is specified for a plane of the reconstruction region.

4. The method of claim 2, wherein the reconstructing takes place with the aid of a Moiré filter.

5. The method of claim 2, further comprising:
checking whether the regions of an object under investigation contained in the reconstruction region are contained in the reconstructed image data during or after the adapting.

6. The method of claim 1, wherein the adapting adapts a matrix size and the matrix size represents an image point count in a plane of the reconstruction region.

7. The method of claim 6, wherein the reconstructing takes place with the aid of a Moiré filter.

8. The method of claim 6, further comprising:
checking whether regions of an object under investigation contained in the reconstruction region are contained in the reconstructed image data during or after the adapting.

9. The method of claim 1, wherein the adapting adapts a layer thickness transverse to an advancing direction to record the projection measurement data relative to an object under investigation.

10. The method of claim 9, wherein the reconstructing takes place with the aid of a Moiré filter.

11. The method of claim 9, further comprising:
checking whether regions of an object under investigation contained in the reconstruction region are contained in the reconstructed image data during or after the adapting.

12. The method of claim 1, wherein the reconstructing takes place with the aid of a Moiré filter.

13. The method of claim 1, wherein the adapting is restricted by pre-determined parameter ranges.

14. The method of claim 13, wherein the adapting is restricted based on overscanned projection measurement data.

15. The method of claim 1, wherein the reconstruction region is selectable by a user.

16. The method of claim 1, wherein at least one of the first, second and third resolution widths is selectable by a user.

17. The method of claim 1, wherein the adapting takes place while taking account of a transmission chain of an imaging system.

18. The method of claim 1, further comprising:
checking whether regions of an object under investigation contained in the reconstruction region are contained in the reconstructed image data during or after the adapting.

19. A non-transitory computer readable medium, when executed by a computer, configured to cause the computer to carry out the method of claim 1.

20. The method of claim 1, wherein the adapted resolution widths are substantially identical in all spatial directions.

21. A reconstruction unit for reconstruction of image data on the basis of projection measurement data generated by a medical imaging system, the reconstruction unit being configured to carry out the reconstruction in three mutually different spatial directions, the three mutually different spatial directions being a first spatial direction, a second spatial direction and a third spatial direction, the first spatial direction associated with a first resolution width, the second spatial direction associated with a second resolution width and the third spatial direction associated with a third resolution width, the reconstruction unit comprising:
an input interface to record the projection measurement data; and
a reconstruction processor configured to,
determine a deviation between the third resolution width and a detector collimation, determine an upper resolution limit and a lower resolution limit based on the deviation, and adapt at least one of the first and second resolution widths to be substantially identical to the third resolution width and in accordance with the upper resolution limit and the lower resolution limit and the adapted resolution width is at least a length of a non-adapted voxel in an isocenter of the medical imaging system.

22. The reconstruction unit of claim 21, further comprising:

a control interface, configured to acquire at least one of a reconstruction region and a reconstruction mode command which specifies that an automatic adaptation of reconstruction intervals takes place.

23. The reconstruction unit of claim 22, further comprising:

a warning device, configured to emit a warning signal if the automatic adaptation cannot be carried out according to a specification by the user.

24. An imaging system for generating at least three-dimensional image data, comprising:

the reconstruction unit of claim 22.

25. The imaging system of claim 24, wherein the imaging system is a computed tomography system.

26. The reconstruction unit of claim 21, further comprising:

a warning device, configured to emit a warning signal if the automatic adaptation cannot be carried out according to a specification by the user.

27. An imaging system for generating at least three-dimensional image data, comprising:

the reconstruction unit of claim 26.

28. The imaging system of claim 27, wherein the imaging system is a computed tomography system.

29. An imaging system for generating at least three-dimensional image data, comprising:

the reconstruction unit of claim 21.

30. The imaging system of claim 29, wherein the imaging system is a computed tomography system.

31. The reconstruction unit of claim 21, wherein the reconstruction processor is configured to specify automatically at least one resolution width in all spatial directions.

* * * * *